United States Patent

Phillips

[11] 3,997,687
[45] Dec. 14, 1976

[54] METHOD OF PREPARING OPTICAL WAVEGUIDES

[75] Inventor: William Phillips, Princeton, N.J.

[73] Assignee: RCA Corporation, New York, N.Y.

[22] Filed: Apr. 21, 1975

[21] Appl. No.: 569,858

[52] U.S. Cl. .......................... 427/12; 350/96 WG; 427/162; 427/163; 427/164; 427/250; 427/255; 427/343; 427/374 R; 427/377; 427/380; 427/399; 427/430 R

[51] Int. Cl.² .................. G02B 5/14; B05D 5/06; C23C 13/02; B05D 3/02

[58] Field of Search .......... 427/162, 163, 255, 343, 427/377, 380, 399, 164, 12, 374 R, 430 R, 250; 350/96 WG

[56] References Cited
UNITED STATES PATENTS 3,837,827   9/1974   Corruthers et al. .......... 350/96 WG

OTHER PUBLICATIONS

Hammer et al., "Low Loss Single Mode Optical Waveguide" in Applied Physics Letters, vol. 24, pp. 545–547, June 1, 1974.
Tien et al., "Optical Waveguide Modes in Single-Crystalline $LiNbO_3$–$LiTaO_3$ Solid-Solution Films," Applied Physics Letters, vol. 24, pp. 503–506, May, 1974.
Minakata et al., "$L.Nb_xTa_{l-y}O_3$ Optical Waveguiding Layer in $LiTaO_3$." Applied Physics Letters vol. 26, pp. 395–398, Apr. 1, 1975.
Standley et al., "Nb–diffused $LitaO_3$ Optical Waveguides." Applied Physics Letters, vol. 25, pp. 711–713, Dec., 1974.

*Primary Examiner*—William H. Schmidt
*Attorney, Agent, or Firm*—Glenn H. Bruestle; Birgit E. Morris; Joseph T. Harcarik

[57] ABSTRACT

A single crystal of lithium tantalate is pretreated to diffuse lithium atoms into the crystal. Niobium is then diffused into the pretreated crystal to form an optical waveguide.

7 Claims, 1 Drawing Figure

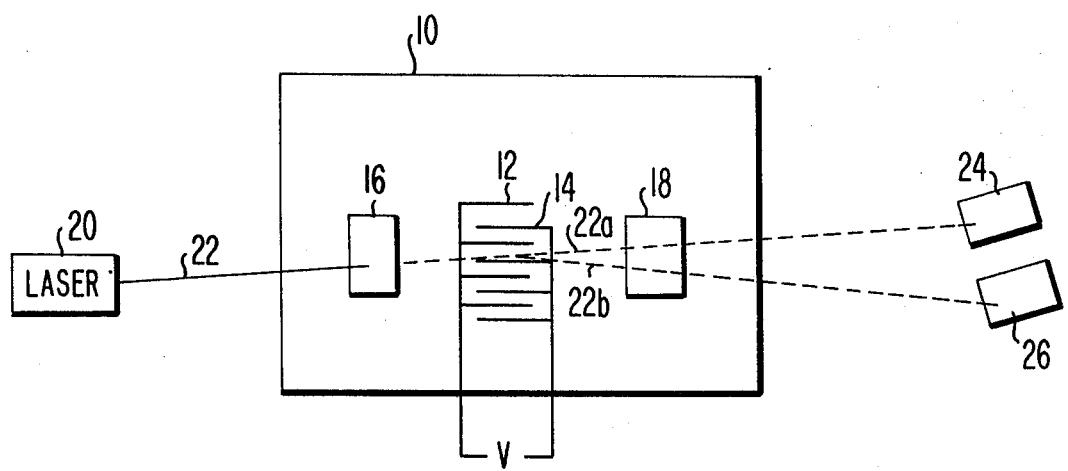

METHOD OF PREPARING OPTICAL WAVEGUIDES

This invention relates to a method of preparing optical waveguides. More particularly, this invention relates to an improved method of making lithium niobate tantalate ($LiNb_xTa_{1-x}O_3$) waveguides having improved properties.

CROSS REFERENCES TO RELATED APPLICATIONS

This application is directed to waveguides and method of making them which are improved over those described in my copending application "Novel Optical Waveguides" Ser. No. 555,725 filed Mar. 6, 1975.

BACKGROUND OF THE INVENTION

Optical waveguides for use in electro-optic modulators and switches prepared by diffusing niobium into a lithium tantalate crystal have been disclosed in my copending application "Novel Optical Waveguides" Ser. No. 555,725 filed Mar. 6, 1975, which is a continuation-in-part of application Ser. No. 442,844 filed Feb. 15, 1974, now abandoned, which is a continuation-in-part of application Ser. No. 434,408 filed Jan. 18, 1974, now abandoned. These waveguides are simple to make and they can be employed to make electro-optic devices which have high efficiency but low power and voltage requirements.

In a preferred embodiment for preparing these waveguides, a polished crystal of lithium tantalate is coated with a thin (400–1,000 angstroms) layer of niobium and heated to a temperature in the range of about 1,050° to 1,250° C. in the presence of oxygen to form niobium oxide and to allow the niobium to diffuse into the crystal. The resultant crystal has a surface layer of the formula $LiNb_xTa_{1-x}O_3$. The niobium diffuses into the layer to a distance which can be controlled by employing proper temperatures, annealing time and the like. However, since lithium niobate and lithium tantalate have the same crystal structure, generally a solid solution of these two crystals is obtained forming a good single crystal waveguide.

One disadvantage to the above-described waveguides is the formation of defect areas and a rough surface on the crystals. It is believed these imperfections are formed due to the occasional formation of precipitates or polycrystalline phases in the crystal due to the excess of niobium near the surface of the crystal. Such defects result in increased scattering of light in the waveguide and attenuation of light propagating in the waveguide, with concomitant losses in efficiency. A method of decreasing such losses has been sought.

SUMMARY OF THE INVENTION

I have found that defects in a lithium niobate tantalate ($LiNb_xTa_{1-x}O_3$) waveguide can be minimized by pre-treating the lithium tantalate substrate so as to incorporate an excess of lithium into the crystal. This is done by annealing the lithium tantalate single crystal with a salt of lithium until lithium atoms have migrated into the lithium tantalate crystal.

BRIEF DESCRIPTION OF THE DRAWING

The FIGURE is a partly schematic view of a deflector modulator employing a waveguide of the invention.

DETAILED DESCRIPTION OF THE INVENTION

A single crystal of lithium tantalate is pretreated by annealing in a salt of lithium. The lithium tantalate crystal is surrounded by a lithium salt such as lithium carbonate, lithium silicate, lithium hydroxide or the like and annealed until excess lithium atoms have migrated into the surface of the lithium tantalate crystal. Preferably, the temperature of annealing is from about 400° C. up to the melting temperature of the lithium salt. Annealing at temperatures above the melting point of the lithium salt is less desirable since it can lead to cracking or partial surface dissolution of the lithium tantalate crystal and to handling problems.

The time required for annealing will vary depending upon the annealing temperature and the selected lithium salt, but is typically about 60 hours.

After annealing and cooling, the crystal is polished and a waveguide prepared in the manner described in my copending application referred to hereinabove.

A niobium layer is then applied either as niobium oxide, as by sputtering, or preferably, as a thin film of niobium which is then oxidized. The film of niobium can be from about 25 to 5,000 angstroms thick and is oxidized by heating in an oxygen-containing atmosphere. The coated crystal can be exposed to oxygen while increasing the temperature up to the annealing temperature, or, can be maintained at a temperature of about 300° to 600° C. until the oxide is formed. The coated crystal is then annealed so as to allow the niobium to diffuse into the crystal. The crystal is annealed by maintaining at a temperature between about 1,050° to 1,250° C., preferably 1,100° to 1,200° C., and then cooled.

After diffusion of niobium into the lithium pretreated lithium tantalate crystal to form the waveguide, the crystal may be poled to optimize the dielectric properties. Poling can be done by cooling the waveguide from above to below its Curie temperature in the presence of an electric field. Poling can be done directly after the diffusion step while cooling to room temperature, or the crystal can be stored and poled at a later time.

The crystals as prepared above can be used to make an efficient, low-cost waveguide deflector or modulator. The FIGURE shows a schematic view of a deflector using the lithium-doped lithium niobate tantalate crystal as prepared above. A pair of interdigitated electrodes 12 and 14 are deposited onto one surface of the crystal. While only one pair of electrodes are shown in the FIGURE, there can be more if desired. Optical input means 16, which can be a strontium titanate optical prism for example, is disposed on one side of the electrodes 12 and 14. Optical output means 18 is disposed on the other side of the electrodes 12 and 14. Diffraction gratings can be applied in place of the prisms 16 and 18 in known manner. A laser 20 serves as a source of coherent light.

In operation, a coherent light beam 22 is directed to the input prism 16 and enters the lithium-doped lithium niobate tantalate crystal 10 at a certain angle. Application of a voltage to the electrodes 12 and 14 result in an electro-optically induced Bragg diffraction grating which diffracts the light entering the crystal 10, thereby deflecting it at an angle from the original direction. Thus one portion of the beam 22a travels in the original direction emerging through one portion of output prism 18 and the deflected portion 22b of the beam travels at an angle to the original direction, emerging through another portion of the output prism 18. The two portions of the beam 22a and 22b can be detected by photomultipliers 24 and 26 respectively for further utilization, as by converting the beam to an electrical signal for further transmission.

Waveguides made according to the above process from pre-treated crystals have decreased losses and fewer defects. Although the exact mechanism of the process is not completely understood, it is believed the losses and defects found in $LiNb_xTa_{1-x}O_3$ waveguides are caused by the lack of stochiometry at the surface of the crystal during diffusion of niobium. By adding an excess of lithium ions, the formation of a solid, single phase solution of lithium niobate and lithium tantalate is facilitated, preventing the formation of precipitates and multiple phases.

The invention will be further illustrated by the following example, but the invention is not meant to be limited to the details described therein.

Losses in the waveguides can be measured using a fiber optic probe with light having a wave length of 6,328 angstroms employing the method of J. E. Goell et al, Bell Syst. Tech. J. 48 3445 (1969), by recording the downstream decay of the scattered light.

EXAMPLE

A single crystal of lithium tantalate was imbedded in lithium carbonate powder and charged to a furnace at about 600° C. for 60 hours. This treatment resulted in the incorporation of at least about $1.5 \times 10^{18}$ atoms of lithium per square centimeter of wave-guide surface.

The surface of two lithium pre-treated lithium tantalate crystals were polished and a film of niobium 800 angstoms thick was evaporated onto one surface of each crystal. An 800 angstrom thick film of niobium was also evaporated onto a polished, untreated lithium tantalate crystal as a control. The crystals were heated to the diffusion temperature in oxygen and then cooled to room temperature. The crystals were poled during cooling with about 2 microamperes of current through each crystal.

The waveguides losses were measured for light propagating parallel to the c-axis.

The preparation and loss data are summarized below.

| SUBSTRATE | DIFFUSION TEMPERATURE, ° C | DIFFUSION TIME, HOURS | LOSS, dB/cm |
| --- | --- | --- | --- |
| Control | 1100 | 6 | 28 |
| Treated in lithium carbonate | 1100 | 6 | 7.2 |
| Treated in lithium carbonate | 1185 | 2.5 | 1.5 |

I claim:
1. The method of making an optical waveguide which comprises:
   a. annealing a single crystal of lithium tantalate in a salt of lithium to diffuse lithium atoms into said crystal wherein the annealing temperature is below the melting point of the lithium salt,
   b. depositing a film of niobium on a polished surface of the said crystal,
   c. oxidizing the niobium,
   d. annealing said crystal at an elevated temperature to allow the niobium to diffuse into said crystal, and
   e. cooling said crystal to room temperature.

2. The method according to claim 1 wherein said lithium salt is lithium carbonate.

3. The method according to claim 2 wherein the annealing step (a) is carried out at about 600° C.

4. The method according to claim 1 wherein the annealing step (a) is carried out at a temperature from about 400° C. up to the melting point of said lithium salt.

5. The method according to claim 1 wherein the annealing step (d) is carried out at a temperature from about 1,050° to 1,250° C.

6. The method according to claim 1 wherein the annealing step (d) is carried out in an atmosphere of oxygen.

7. The method according to claim 1 wherein said crystal is poled during the cooling step.

* * * * *

UNITED STATES PATENT OFFICE
CERTIFICATE OF CORRECTION

PATENT NO. : 3,997,687

DATED : December 14, 1976

INVENTOR(S) : William Phillips

It is certified that error appears in the above-identified patent and that said Letters Patent are hereby corrected as shown below:

Column 1, line 10, insert the following paragraph. --The Invention herein described was made in the course of or under a contract or subcontract thereunder, with the Department of the Navy.--

Signed and Sealed this

Twenty-second Day of March 1977

[SEAL]

Attest:

RUTH C. MASON
*Attesting Officer*

C. MARSHALL DANN
*Commissioner of Patents and Trademarks*